United States Patent
Tseng et al.

(10) Patent No.: US 8,469,274 B2
(45) Date of Patent: Jun. 25, 2013

(54) METHOD FOR FAST LOCATING DECIPHERABLE PATTERN

(75) Inventors: Chun-Shun Tseng, Keelung (TW);
Ya-Yun Jheng, Taipei County (TW);
Ming-Chi Jhuang, Keelung (TW);
Shih-Hsun Chen, Taipei County (TW);
Hai-Peng Cheng, Taipei County (TW);
Te-Heng Hsiang, Taipei County (TW);
Jung-Hua Wang, Keelung (TW)

(73) Assignees: Armorlink SH Corp.,
Min-Sing-Sin-Jhuang Industrial District,
Shang-Hai; ICP Electronics, Inc., Xizhi
Dist., New Taipei (TW)

( * ) Notice: Subject to any disclaimer, the term of this patent is extended or adjusted under 35 U.S.C. 154(b) by 373 days.

(21) Appl. No.: 12/604,402

(22) Filed: Oct. 23, 2009

(65) Prior Publication Data
US 2010/0163632 A1 Jul. 1, 2010

(30) Foreign Application Priority Data

Dec. 31, 2008 (TW) ................................ 97151929 A

(51) Int. Cl.
*G06K 7/10* (2006.01)
(52) U.S. Cl.
USPC ............. 235/462.08; 235/462.01; 235/462.09
(58) Field of Classification Search
USPC .................... 235/454, 462.01, 462.09, 462.1, 235/462.12, 462.19, 462.27, 487, 494
See application file for complete search history.

(56) References Cited

U.S. PATENT DOCUMENTS

| | | | | |
|---|---|---|---|---|
| 5,866,895 A | * | 2/1999 | Fukuda et al. | 235/494 |
| 6,729,544 B2 | * | 5/2004 | Navon | 235/462.14 |
| 7,051,937 B2 | * | 5/2006 | Albertelli et al. | 235/462.25 |
| 7,121,469 B2 | * | 10/2006 | Dorai et al. | 235/470 |
| 7,471,830 B2 | * | 12/2008 | Lim et al. | 382/181 |
| 7,773,808 B2 | * | 8/2010 | Lim et al. | 382/181 |
| 8,229,222 B1 | * | 7/2012 | Silver et al. | 382/181 |
| 8,363,972 B1 | * | 1/2013 | Silver et al. | 382/261 |
| 2006/0113390 A1 | * | 6/2006 | Muramatsu | 235/462.27 |
| 2008/0116277 A1 | * | 5/2008 | Tomita | 235/462.11 |

* cited by examiner

Primary Examiner — Daniel Hess
Assistant Examiner — Paultep Savusdiphol
(74) Attorney, Agent, or Firm — Winston Hsu; Scott Margo

(57) ABSTRACT

A method for fast locating a decipherable pattern in an input image, which is characterized in utilizing an overly downscaled binary image to not only reduce computation time but also facilitate extraction of skeletons for fast and accurately locating pattern, is disclosed. First, a pre-process is applied to an input image to acquire a binary image downscaled n times, from which at least one skeleton corresponding to a decipherable pattern is extracted. Coordinate values of at least one pixel of each skeleton are respectively enlarged $n^{1/2}$ times and used as the central points on the original image plane for establishing a plurality of detecting blocks with the identical size. Subsequently, a grading mechanism is employed to determine the corresponding detecting blocks of the decipherable pattern.

19 Claims, 21 Drawing Sheets

(a)
 (b)
 (c)
 (d)
 (e)
 (f)

METHOD FOR FAST LOCATING DECIPHERABLE PATTERN

BACKGROUND OF THE INVENTION

1. Field of the Invention

The present invention relates to an automatic image processing and pattern recognition method, and more particularly, to a method for locating a decipherable pattern in an input image captured by an arbitrary image acquisition device, such as a camera, a scanner, CIS (contact image sensor), and various types of hand-held devices such as a mobile phone, a personal digital assistant (PDA), and/or the like.

2. Description of the Prior Art

The decipherable pattern in the present invention refers to a pattern containing a plurality of lines at intervals, such as barcodes and biological signature of human fingerprints, which are widely used nowadays in various industries. Take barcodes as an example, a barcode is a typical decipherable pattern which is just a different way of encoding numbers and letters by using a combination of bars and spaces of varying widths. In business, the correct use of barcodes can reduce inefficiencies and improve a company's productivity. Logistics, manufacturing, healthcare, retail, security, etc. all have symbologies unique to their industry and aren't interchangeable.

Barcodes come in many styles and forms. Most of us are familiar with the ones seen in grocery or retail stores, but there are many others that are used as standards in various industries. No matter how differently they may look, any existing commercial barcode reader devices involve only two major functions, one is for barcode locating and the other for barcode decoding. For the locating function, there are three basic types of barcode readers—fixed, portable batch, and portable wireless. Fixed readers (hand held or mounted) remain attached to their host computer or terminal, and transmit one data item at a time as the barcode is scanned. Although many decoding algorithms have been developed, most existing hand-held barcode readers, especially in the case of 2-D barcode, must rely on the user to manually maneuver the reader device to the barcode region roughly centered at an auxiliary light point emitted from the reader, that is, correct decoding is possible only when the user can complete the maneuvering task in order to successfully target the barcode. This inefficiency problem could easily become worse if the hand-held reader device is used to process large number of articles with decipherable patterns, and it becomes even complicated the case where parcels vary greatly in size and shape. This limitation of manual locating must be removed in order to realize automation and efficiency improvement.

With the great increase in resolution of digital cameras that come as standard equipment on various types of portable devices, it is possible that users can locate and decode the decipherable patterns by taking pictures without using the auxiliary light point provided by the portable devices. Through the high resolution (e.g., SXGA, 1280×1024) image sensors on the portable device, an user can easily acquire a picture that encompass the decipherable pattern by merely moving the portable device close to a decipherable pattern and taking the picture. Generally, the decipherable pattern thus obtained would be in random location and orientation within the taken pictures. Furthermore, it is not rare to see that barcodes are located close to graphic and other text elements, all of which add significant "noise" to the barcode locating. An exemplary method of locating a barcode within a picture taken via a high-resolution imaging system is described in U.S. Pat. No. 6,729,544, entitled "Fast barcode search", which divides the captured image into a plurality of tiles and then scans each tile so as to detect a pattern of stripes associated with the barcode in at least one of the tiles, the pattern of stripes is analyzed later so as to determine an angle of orientation of the barcode. However, because the method is applied under original image resolution and the original image needs to be entirely scanned (i.e., a region of interest needs to be pre-defined) to achieve barcode locating, computation load will raise rapidly as the image resolution increases. Thus, the search algorithms that perform computation on the original image plane are not practical, if one considers using a cost-saving and light-weight portable device to handle the task of finding decipherable patterns with arbitrary locations in a high resolution image. Furthermore, presence of other graphic and other text elements in the input image and partial corruption of the decipherable patterns per se also raise the possibility of erroneous search.

In view of the foregoing, a need exists in the art to develop a simple and fast locating algorithm capable of automatically locating a decipherable pattern in a very large, noisy image within the tight time constraints of a cost-saving portable device.

SUMMARY OF THE INVENTION

A primary objective of the present invention is to provide a method for fast locating a decipherable pattern in an input image, which downscales the input image to extract a plurality of skeletons, comprising the steps of: (A) applying a pre-process to the input image to acquire a binary image downscaled n times, wherein n is a real number; (B) identifying a plurality of black lines so as to extract at least one skeleton; (C) enlarging each of the coordinate values of at least one pixel of the at least one skeleton by $n^{1/2}$ times, and on the input image plane, using the enlarged coordinate values as the central points for establishing a plurality of detecting blocks, wherein each detecting block contains a plurality of pixel feature values corresponding to the input image plane; and (D) employing a grading mechanism to determine the corresponding detecting blocks of the decipherable pattern.

The pre-process further the steps of: downscaling the input image in order to decrease the number of pixels, filtering the input image by using a low-pass filter, compensating the illumination of the input image; binarizing the pixel feature values of the input image; and filling the broken areas of the input image and eliminating the redundant black pixels of the input image. The step of downscaling the input image uses a bilinear interpolation to downscale the input image. The low-pass filter used in the step of filtering the input image is a mean filter. The method of the present invention uses a log transformation to compensate illumination of the input image, and uses a constant threshold or an adaptive threshold to binarize the pixel feature values of the input image.

If the input image is a grayscale image, the pixel feature values are the grayscale values of the grayscale image respectively. If the input image is a color image, the input image is transformed into a grayscale image, and the pixel feature values are the grayscale values of the grayscale image respectively.

The present invention has three key technical aspects. First, the overly downscaling manner of the pre-process is intentionally utilized. Compared to Ohbuchi et al. "Barcode Readers using the Camera Device in Mobile Phones", Proceedings of the 2004 International Conference on Cyberworlds, Pages: 260-265, where 4 times (2×2) downscale rate is employed, the exemplar downscale factor 144 (12×12) is much larger.

The term "overly downscaling" refers to that the input image is intentionally downscaled to such extent where the output image contains only a blurred and distorted decipherable pattern. Doing so may appear awkward in the field of image processing which usually seeks for vivid and sharpened patterns, but in the present invention the geometric detail of the decipherable pattern is less important as the purpose here is to quickly identify the location of the decipherable pattern. For this purpose, an overly downscaled but blurred pattern is more helpful than a vivid and sharpened pattern. Because the decipherable pattern will be surrounded by quiet zone in most cases, a blurred region of which still can be easily differentiated from other graphic and text elements on the overly downscaled image. Because calculation is performed on a low image resolution at this stage, it helps reduce the computation load of the whole locating process. Particularly, subsequent extraction of a plurality of skeletons can be made faster.

The extraction of the skeletons is another key technical aspect of the present invention. The pre-processed binary image will be scanned pixel by pixel along an arbitrary first direction. In each scan, the binary values of the pixels successively appear and will be checked. If a sequence of white, at least one black and white is detected, the locations of the black pixels are recorded, i.e., the white pixels only appear twice as start and end marks. In this way, a plurality of parallel black lines can be obtained by connecting the successive black pixels, and the adjacent middle pixels of the black lines are connected to obtain at least one skeleton. After the binary image has completely been scanned, the scanning and recording process is applied to a second direction perpendicular to the first direction. Because the skeletons obtained from the first and second directions are separately recorded, the intersected skeletons on the pre-processed binary image can be handled. With this two mutually perpendicular scanning, the method of the present invention is insensitive to location and orientation of the decipherable pattern appears in the pre-processed binary image. Note that the scanning process can be proceeded either in progressive or interlaced fashion upon users' requirements.

Another key technical aspect of the present invention is to extract at least one pixel for each skeleton, and their coordinate values are enlarged by $n^{1/2}$ times. The merits of doing so are twofold: (1) due to aforementioned downscaling, the distances between two enlarged coordinate points are identical, searching in the original input image per pixel is needless and the computation time can be saved; (2) robustness to distorted decipherable pattern is enhanced because the sampling points are distributed right along the decipherable pattern. Besides, as the coordinate values of the sampling points are used as the central points for establishing a plurality of detecting blocks, a grading mechanism can be defined using geometrical characteristics of the decipherable pattern to determine the corresponding detecting blocks to which the decipherable pattern belongs.

Another objective of the present invention is to provide a computer-readable storage medium stores computer executable program implementing a method according to the present invention.

Another objective of the present invention is that unwanted noises in the original image are almost erased due to the pre-process.

Another objective of the present invention is that the locating method can be incorporated with a barcode decoding module to implement a barcode reader.

These and other objectives of the present invention will no doubt become obvious to those of ordinary skill in the art after reading the following detailed description of the preferred embodiments that is illustrated in the various figures and drawings.

DETAILED DESCRIPTION

The present invention provides a method for fast locating a decipherable pattern in an input image, which is characterized in utilizing an overly downscaled binary image to extract a plurality of skeletons in the decipherable pattern.

Figure 1A:
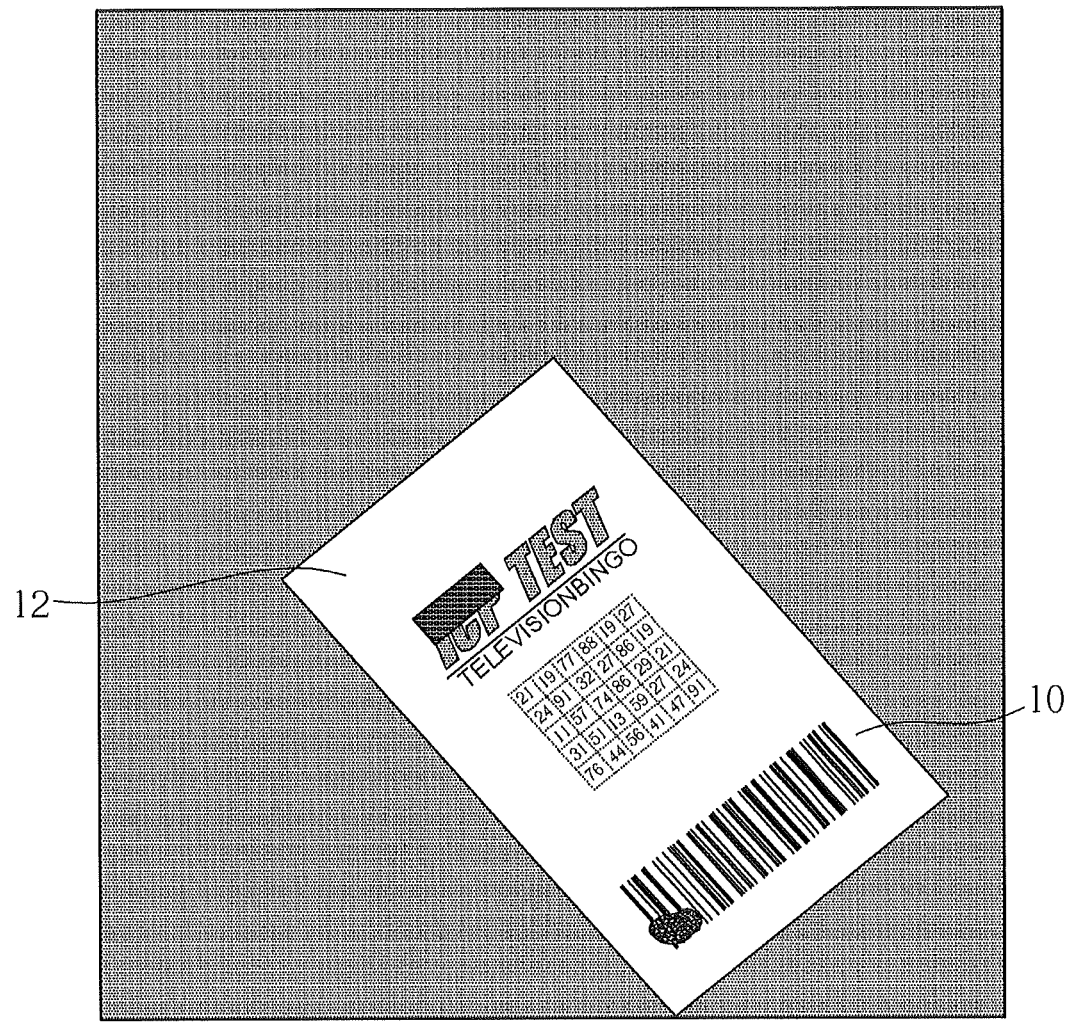
FIG. 1A depicts an input image containing a partially corrupted 1-D barcode (Code 128) and other text/graphic elements.

First Illustrative Embodiment of the Method for Fast Locating Decipherable Pattern in an Input Image of the Present Invention FIG. 1A depicts an input image containing a partially corrupted 1-D barcode (Code 128) 10 and other text/graphic elements. The decipherable pattern locating method is still effective even in presence of corrupted area 12.

The minimum module width of bar and space of the barcode 10 in the input image FIG. 1A comprises at least certain number (3) of pixels, thus undesirable effects caused by the image acquisition device can be avoided. Furthermore, the performance of the camera lens, circuit design, auto-focus and noise filtering, etc. are all essential factors for a good image acquisition, and the settings of those factors are hard to be defined. To simplify, the term "good" is defined as that the barcode in the input image is recognizable with naked eyes. Under this assumption, a downscale factor $n \geq 100$ is applicable to most image capture environments, and n is set to 144 in this embodiment. Although the downscale factor less than 100 is also applicable for the illustrative embodiment, the computation time will increase.

Figure 1B:
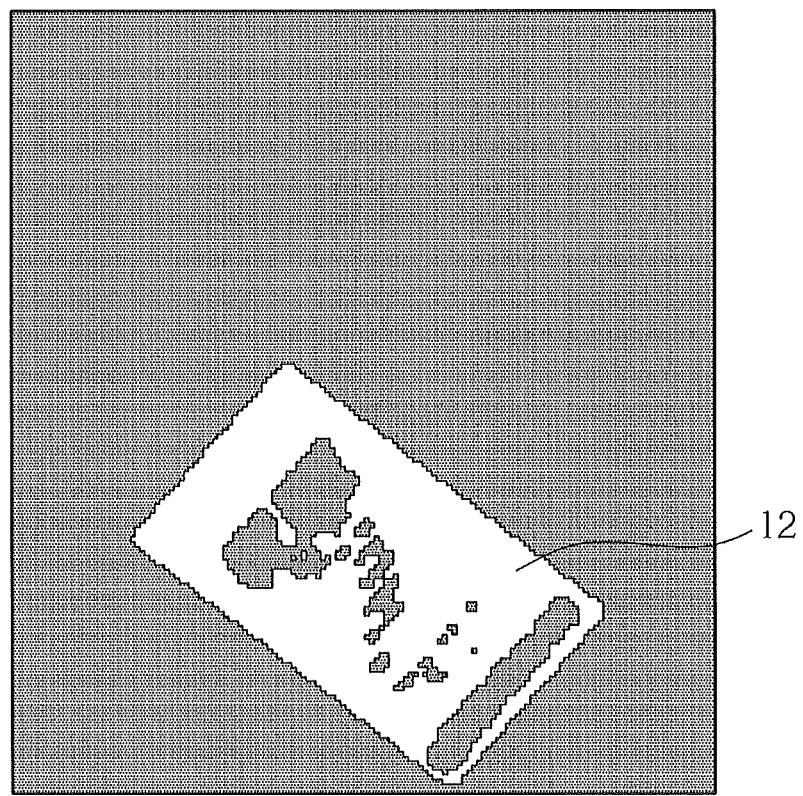
FIG. 1B illustrates a binary image downscaled n times, using FIG. 1A as an input image without filling the broken areas.
Figure 1C:
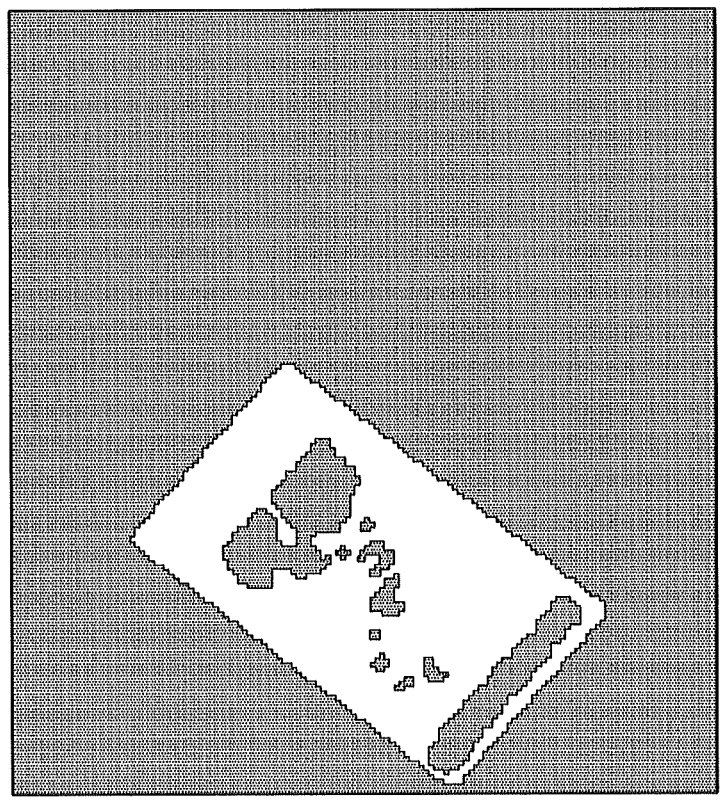
FIG. 1C shows a binary image downscaled n times, using FIG. 1A as an input image with filling the broken areas.
Figure 4:
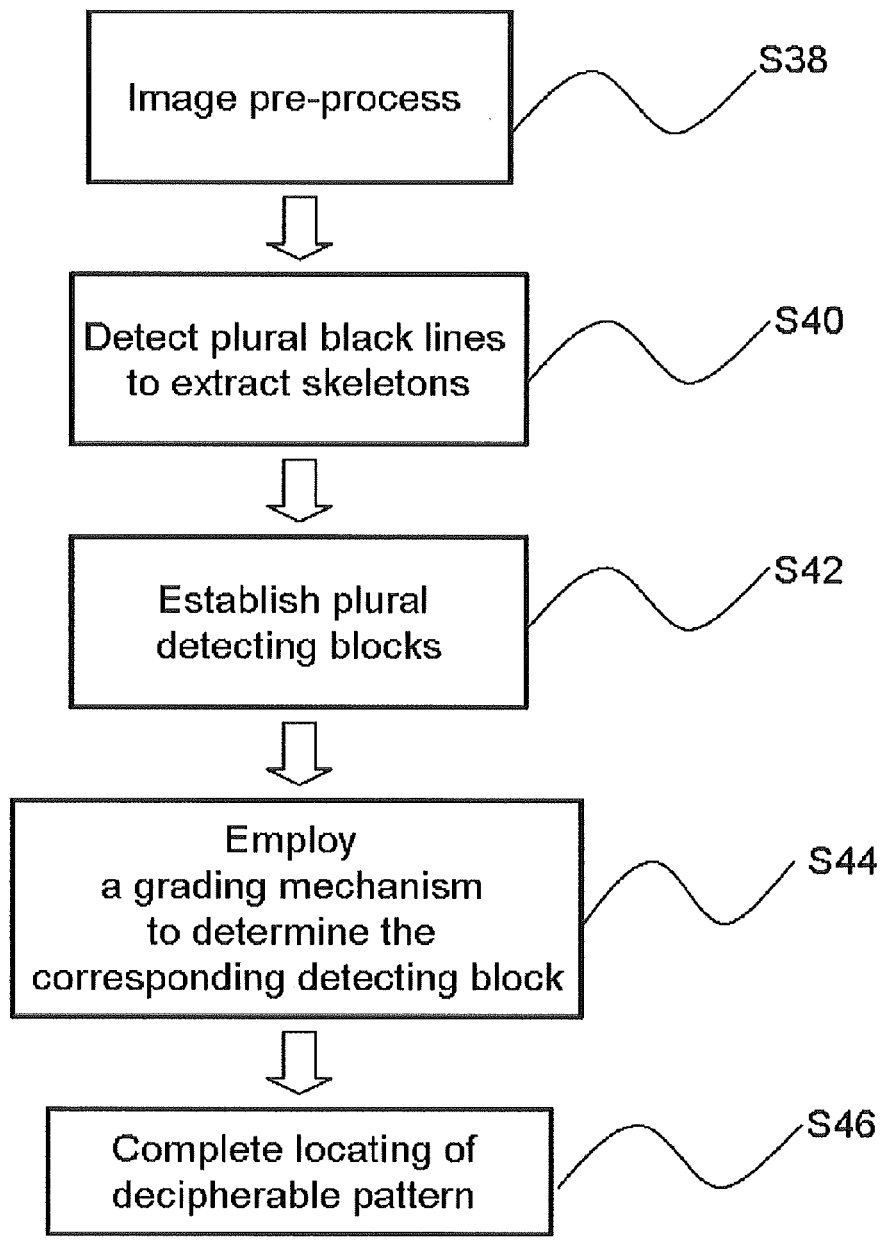
FIG. 4 illustrates a flowchart of the present invention for locating a decipherable pattern.

The pre-process step S38 in FIG. 4 comprises the steps of: downscaling the input image in order to decrease the number of pixels, filtering the input image by using a mean filter, compensating the illumination of the input image, binarizing the input image by using a constant threshold or an adaptive threshold, and filling the broken areas of the input image and eliminating the redundant black pixels of the binarized image FIG. 1B. The result of the pre-process step S38 using FIG. 1A as the input image is shown in FIG. 1C.

Figure 1D:
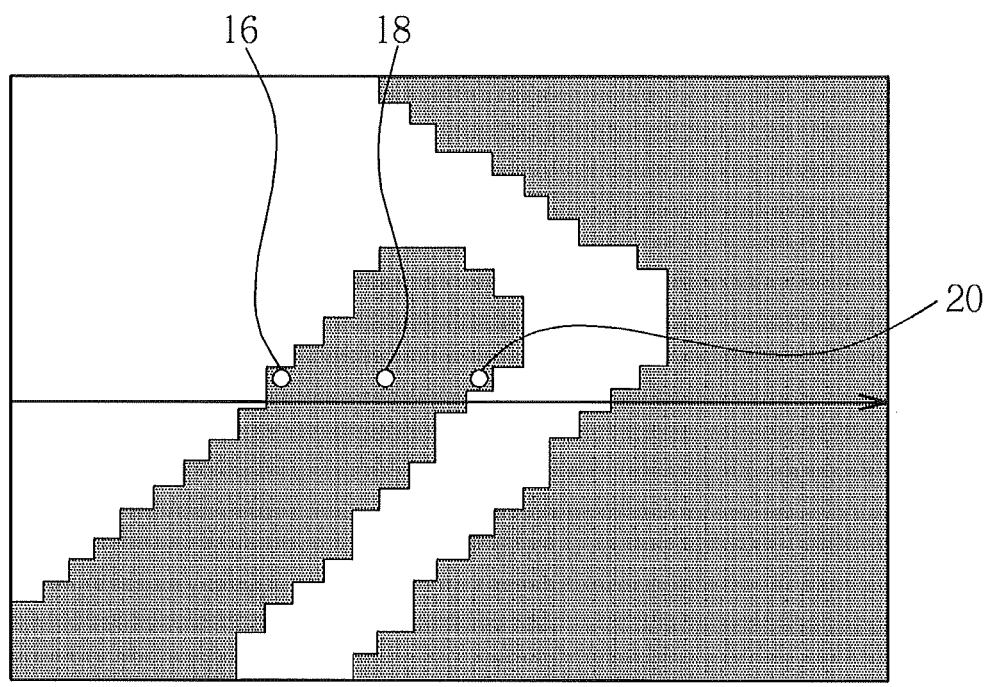
FIG. 1D schematically shows a horizontal scan process.
Figure 1E:
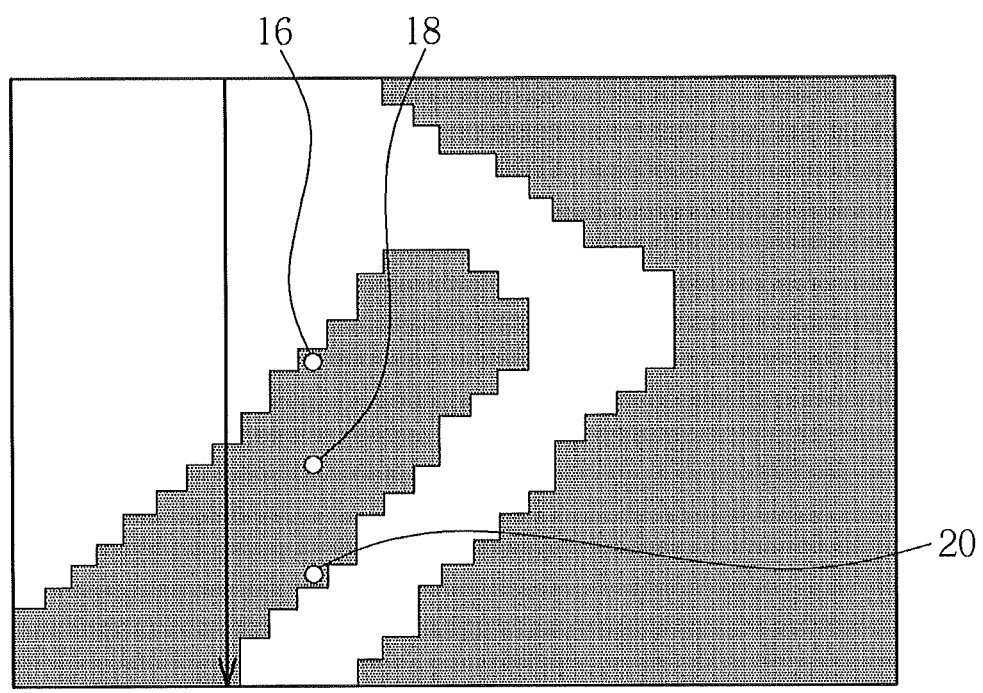
FIG. 1E schematically shows a vertical scan process.
Figure 1F:
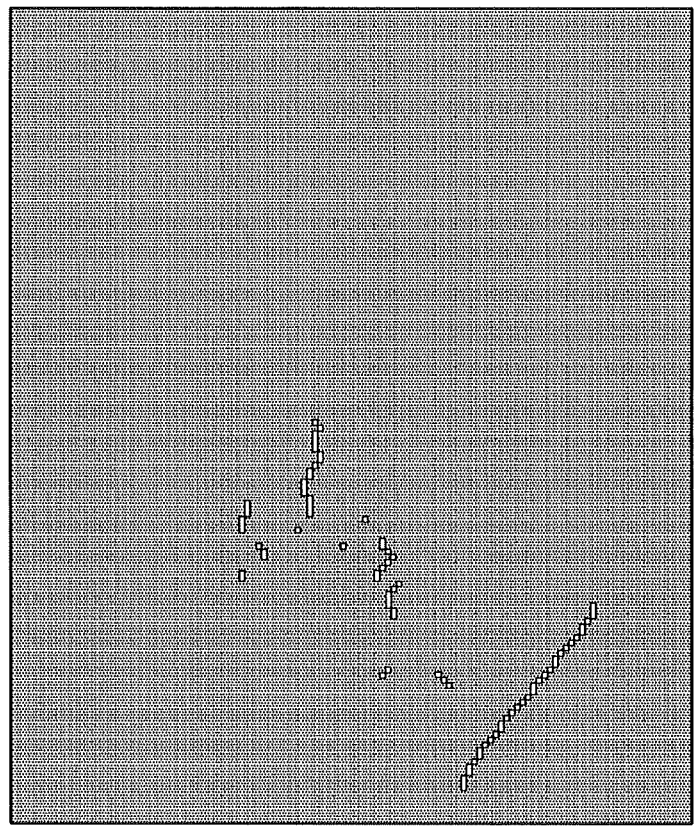
FIG. 1F schematically shows a plurality of skeletons obtained from horizontally scanning a plurality of black lines.

FIG. 1D schematically presents a skeleton extraction process S40, which scans the downscaled binary image in a first direction (horizontal). The downscaled binary image can be further scanned in a second direction. Note that, the first direction can be arbitrarily selected and not limited in aforementioned direction in the illustrative embodiment, as long as the second direction is perpendicular to the first direction. By doing so, the skeleton extraction process can identify the location of the decipherable pattern in one of the two directions, and orientation of the decipherable pattern is irrelevant. During each scan, a first location 16 is detected as shown in FIG. 1D, at which a black pixel appears after a white pixel; a second location 20 in turn is detected as shown in FIG. 1D, at which a black pixel appears before a white pixel. A black line is obtained by connecting the first location and the second location. After the binary image has completely been scanned in the first direction, a plurality of black lines can be acquired. The middle points of the black lines shown in FIG. 1D (one of the middle points, 18), are extracted and the adjacent middle points are connected to obtain a plurality of skeletons, as shown in FIG. 1F.

Figure 1G:
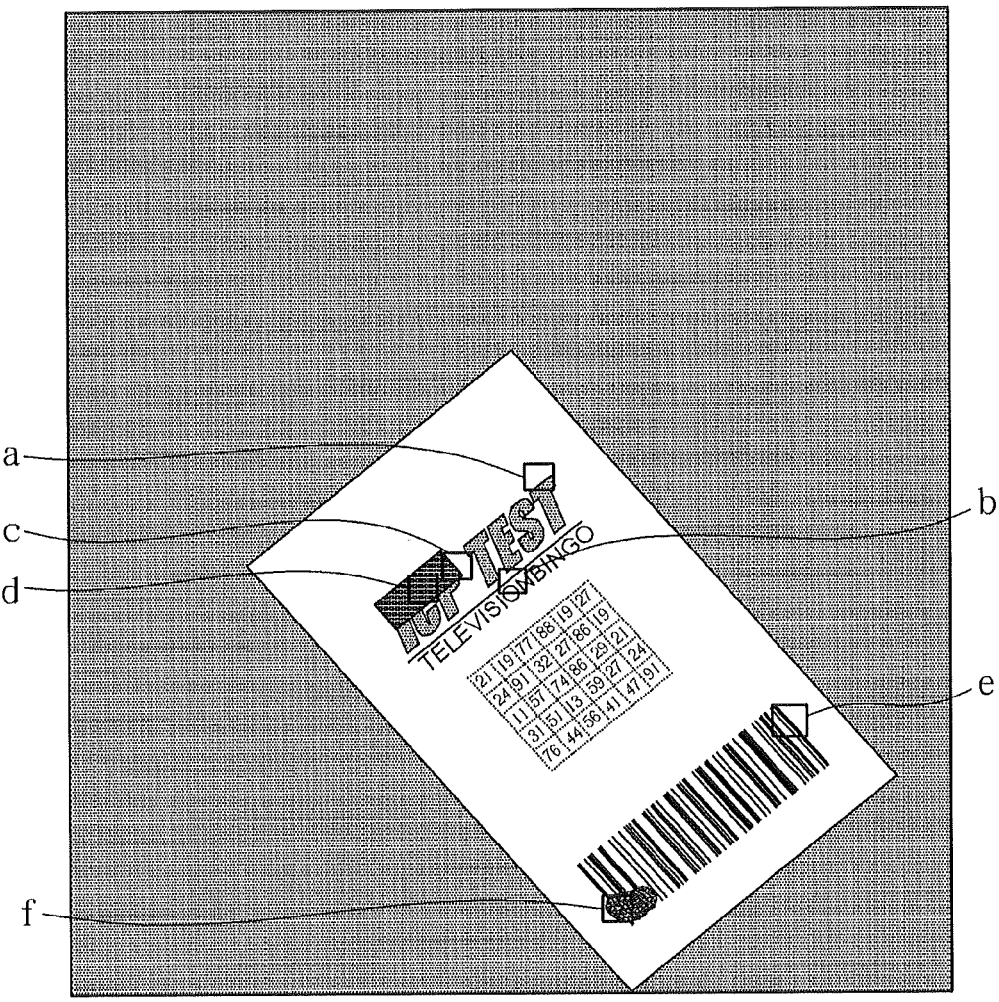
FIG. 1G schematically shows a plurality of detecting blocks, wherein the coordinate values of both ends of the skeletons in FIG. 1F are enlarged by 12 times and used as the central points for establishing the detecting blocks with an identical size, where (a, b), (c, d), and (e, f) are the detecting blocks respectively corresponding to both ends of each skeleton.
Figure 1H:
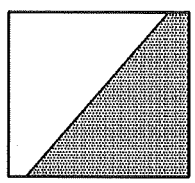
FIG. 1H schematically shows the extracted detecting blocks, where (a, b), (c, d), and (e, f) are the detecting blocks respectively corresponding to both ends of each skeleton.
Figure 1H:
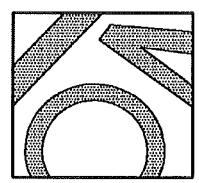
Figure 1H:
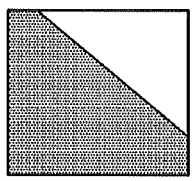
Figure 1H:
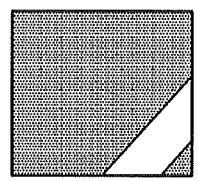
Figure 1H:
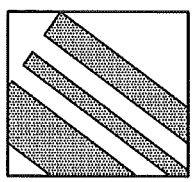
Figure 1H:
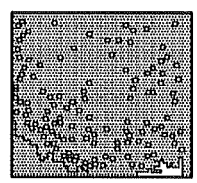

In step S42, the algorithm for establishing a plurality of detecting blocks using the skeletons can be designed by utilizing geometric characteristics of each decipherable pattern. In the first embodiment, the coordinate values of both ends of the remained skeletons are enlarged by 12 times (i.e. square root of 144). The enlarged coordinate values are used as the central points for establish the detecting blocks with an identical size. Preferably, the detecting blocks are rectangular as shown in FIG. 1G and FIG. 1H, wherein each detecting block contains a plurality of pixel feature values in the original image plane. Denote M/W as the ratio between width of the input image M and width of the detecting blocks W, $12 \leq M/W \leq 64$; and N/H as the ratio between height of the input image N and height of the detecting blocks H. Note that N/H=M/W. In this embodiment, N/H=M/W=50.

Next a grading mechanism S44 is used to determine the detecting blocks to which the decipherable pattern belongs. As in step S42, the mechanism S44 is designed utilizing geometrical characteristics of the decipherable pattern. In the first embodiment, wherein the decipherable pattern is a 1-D barcode with rectangular contour and a plurality of parallel lines, thus the grading mechanism further comprises the following steps: (a) the enlarged coordinate values of both ends of the remaining skeletons are connected to obtain a line in the input image, the pixel values of the line is recorded and binarized, and the number of times switching between the black and white pixels within the line is recorded; (b) binarizing the detecting blocks; (c) extracting the skeletons of the binarized detecting blocks by aforementioned skeleton extraction process, so as to obtain the number of skeletons having small orientation difference ($<5°$) and similar length; and (d) multiplying the number of times obtained in step (a) and the number of skeletons obtained in step (c) to obtain the scores for each detecting block.

The scores of the detecting blocks are sorted, and one of the detecting blocks with the highest score is chosen as the location of the decipherable pattern.

Figure 2A:
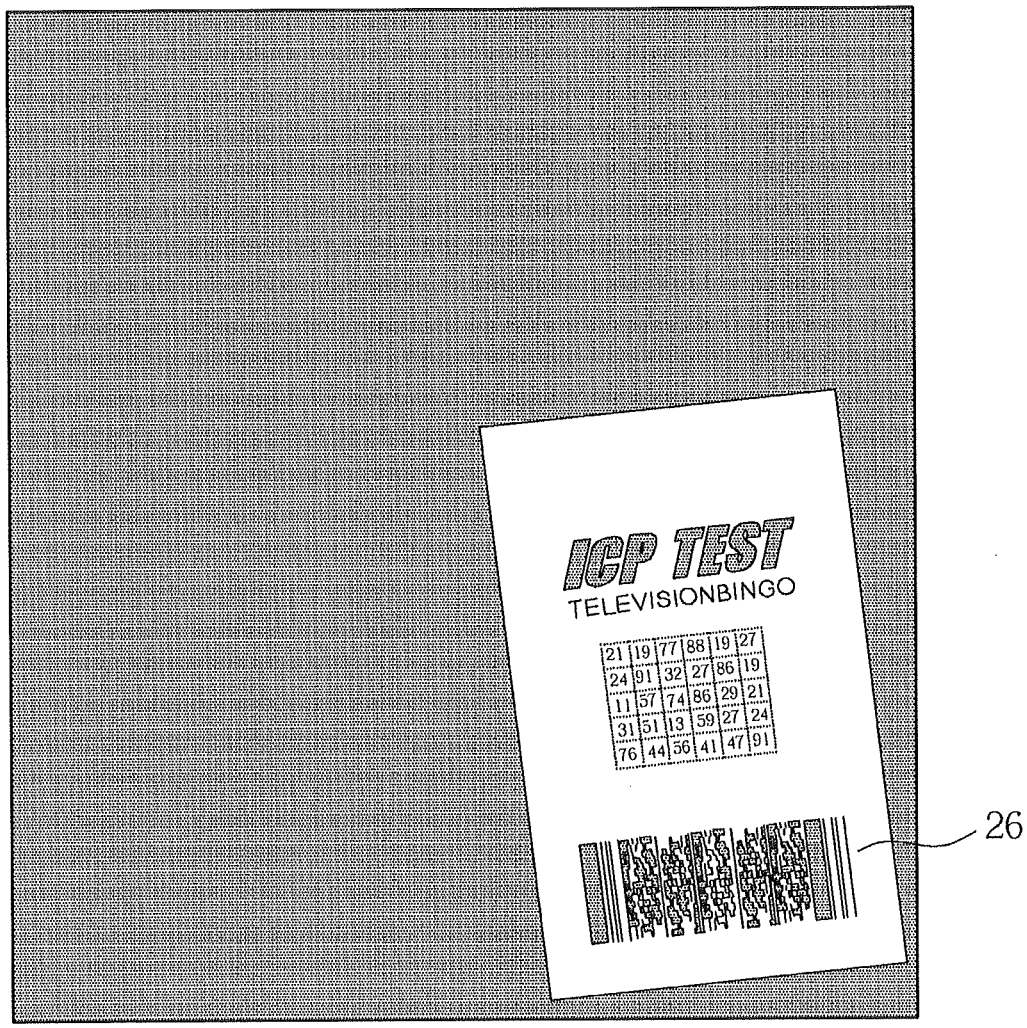
FIG. 2A depicts an captured image containing a 2-D barcode 26 (PDF417) and other text/graphic elements.

Second Illustrative Embodiment of the Method for Fast Locating Decipherable Pattern in an Input Image of the Present Invention FIG. 2A depicts an input image containing a 2-D barcode 26 (PDF417) and other text/graphic elements.

The minimum module width of bar and space of the barcode 26 in the input image FIG. 2A comprises at least three pixels. As in the first embodiment, a downscale factor n is set to 144 in the second embodiment.

Figure 2B:
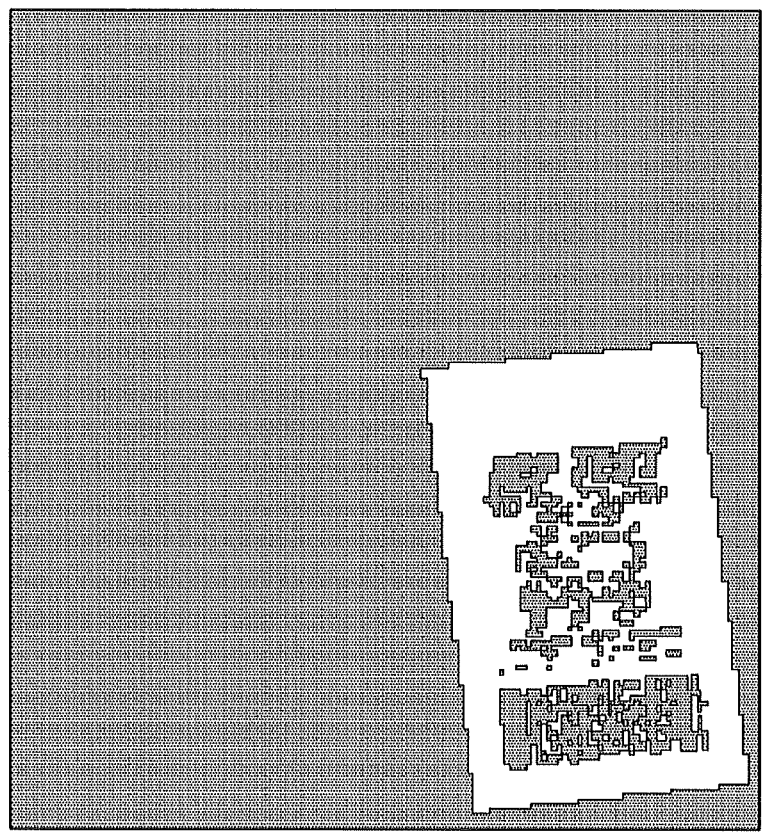
FIG. 2B illustrates a binary image downscaled n times, using FIG. 2A as an input image without filling the broken areas.
Figure 2C:
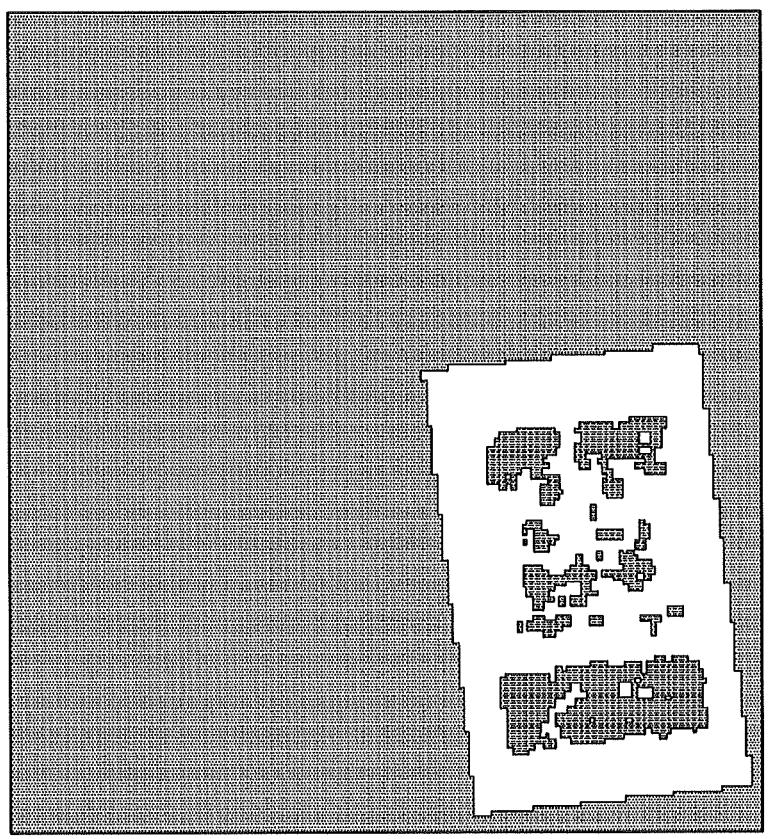
FIG. 2C shows a binary image downscaled n times, using FIG. 2A as an input image with filling the broken areas.

FIG. 2C is a downscaled binary image, which undergoes a pre-process step S38 using FIG. 2A as an input image. The step S38 in FIG. 4 comprises the steps of: downscaling the input image in order to decrease the number of pixels, filtering the input image by using a low-pass filter, compensating the illumination of the input image, binarizing the input image by using a constant or an adaptive threshold, and filling the broken areas of the input image and eliminating the redundant black pixels of the binarized image FIG. 2B.

Figure 2D:
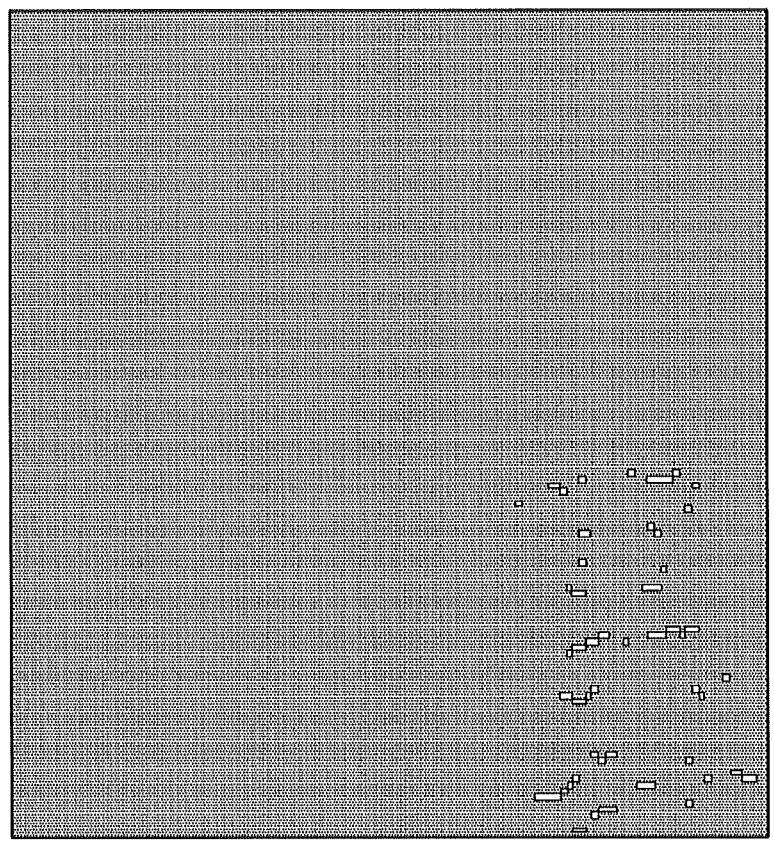
FIG. 2D schematically shows a plurality of skeletons obtained from vertically scanning a plurality of black lines.

A skeleton extraction process S40 is employed to scan the downscaled binary image in a first direction (horizontal). The downscaled binary image can be further scanned in a second direction. Note that, the first direction can be arbitrarily selected, as long as the second direction is perpendicular to the first direction. By doing so, the skeleton extraction process can identify the location of the decipherable pattern in one of the two directions, and orientation of the decipherable pattern is irrelevant. During each scan, a first location at which a black pixel appears after a white pixel and a second location at which a black pixel appears before a white pixel are in turn detected, and a black line is obtained by connecting the first location and the second location. After the binary image has completely been scanned in the second direction, a plurality of black lines can be acquired, then the middle points of the black lines are extracted and the adjacent middle points are connected to obtain a plurality of skeletons, as shown in FIG. 2D.

Figure 2E:
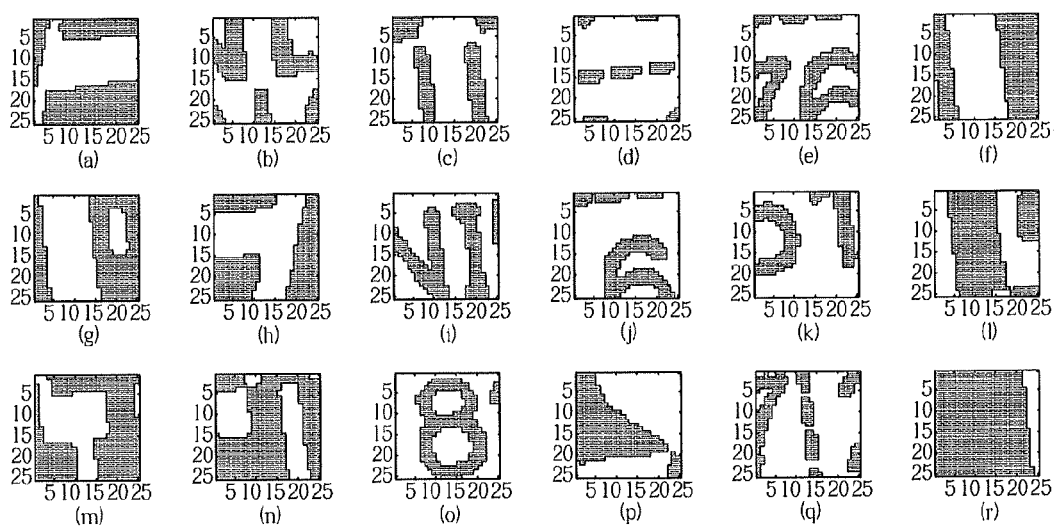
FIG. 2E schematically shows a representation of a plurality of detecting blocks, wherein the coordinate values of the middle pixel of the skeletons are enlarged and used as the central points for establishing the detecting blocks, with a, b, c, d, e, f, g, h, i, j, k, l, m, n, o, p, q, and r are respectively corresponding to the middle pixel of each skeleton.

In this embodiment, the coordinate values of the middle pixel of the skeletons are also enlarged 12 times. The enlarged coordinate values are used as the central points to set up a plurality of detecting blocks with an identical size. Preferably, the detecting blocks are rectangular as shown in FIG. 2E, wherein each detecting block contains a plurality of pixel feature values in the original image plane. Also, N/H=M/W=64 in this embodiment.

As aforementioned, the grading mechanism S44 can be defined by utilizing geometrical characteristics of the decipherable pattern. In the current embodiment, the decipherable pattern is PDF417 (2-D barcode), which is characterized in two mutually perpendicular line directions (encoding direction and stacking direction) within the barcode area, thus the grading mechanism further comprises the following steps: (a) binarizing the pixel value of the detecting blocks; (b) scanning along one direction to detect a plurality of boundary points that switch between a black pixel and a white pixel within the detecting blocks; (c) scanning another direction perpendicular to the direction in step (b), and a plurality of boundary points that switch between a black pixel and a white pixel within the detecting blocks are detected; (d) if the number of the boundary points in step (b) is greater than the number of the boundary points in step (c), then apply Hough transformation to the boundary points in step (b), and vice versa. After Hough transformation, an angle is obtained and used as the encoding direction of the PDF417; (e) obtaining m start points by extending in the tangent direction of the encoding direction from the central points, m≧5; (f) obtaining m grading lines by extending in the encoding direction from the start points respectively; (g) if the start/stop marks of PDF417 exist within one grading line, the corresponding score is added by 1, thus the highest score of each corresponding detecting block is m; and (h) if more than one detecting block has the same score, then choose the one with shortest corresponding skeleton length.

Figure 2F:
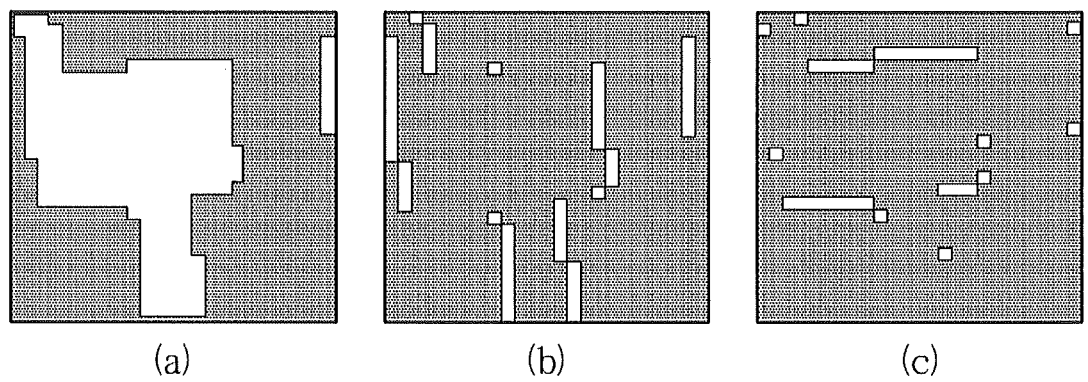
FIG. 2F schematically shows the result from scanning in two directions that are perpendicular to each other, where a corresponds to FIG. 2E-$m$, b shows a result from scanning in a single direction (horizontally), and c shows the scanned result in a single direction perpendicular to the direction used in b.

FIG. 2E-$a$ is used as an example to interpret the mechanism of extracting the boundary points. The horizontal scan result of detecting the boundary points of FIG. 2F-$a$ is shown in FIG. 2F-$b$, and the vertical scan result of detecting the boundary points of FIG. 2F-$a$ is shown in FIG. 2F-$c$, wherein the boundary points in FIG. 2F-$b$ undergo Hough transformation due to the number of the boundary points in FIG. 2F-$b$ is greater than that in FIG. 2F-$c$.

Figure 3A:
FIG. 3A depicts an image containing a fingerprint pattern.

Third Illustrative Embodiment of the Method for Fast Locating Decipherable Pattern in an Input Image of the Present Invention FIG. 3A depicts an image containing a fingerprint pattern 30. FIG. 3C is a binary image downscaled 144 times using FIG. 3A as an input image.

Figure 3B:
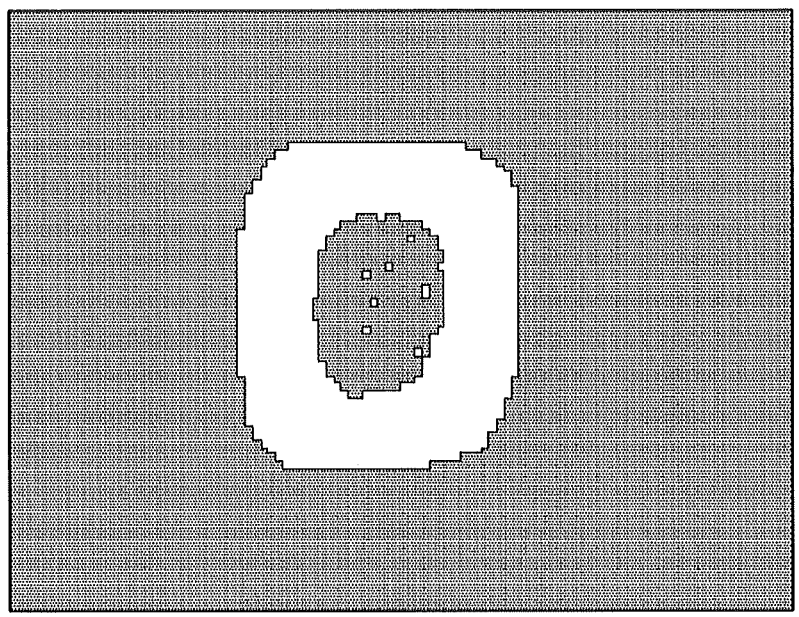
FIG. 3B shows a binary image downscaled n times, using FIG. 3A as an input image without filling the broken areas.
Figure 3C:
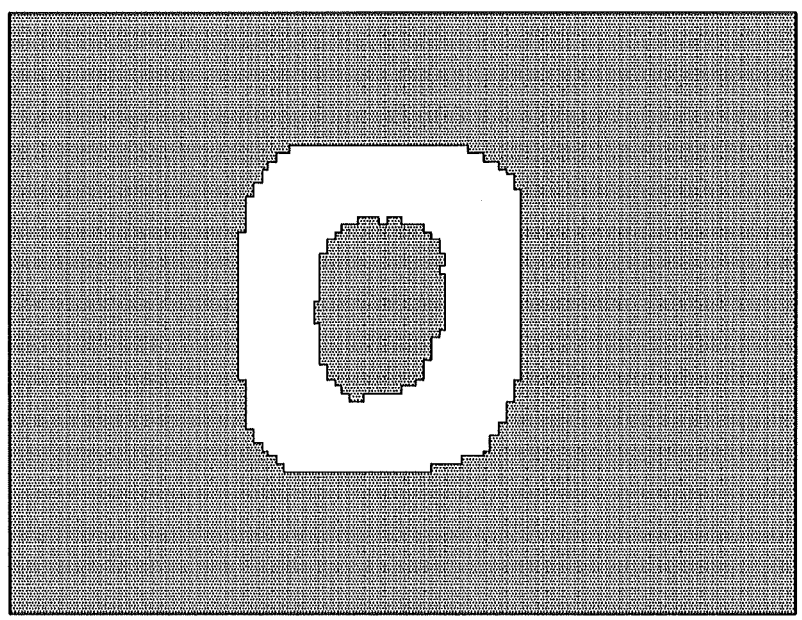
FIG. 3C shows a binary image downscaled n times, using FIG. 3A as an input image with filling the broken areas.

The pre-process step S38 further comprises the steps of: filtering the input image by using a mean filter, compensating the illumination of the input image, binarizing the input image using a constant threshold or an adaptive threshold, and filling the broken areas of the input image and eliminating the redundant black pixels of the binarized image FIG. 3B.

Figure 3D:
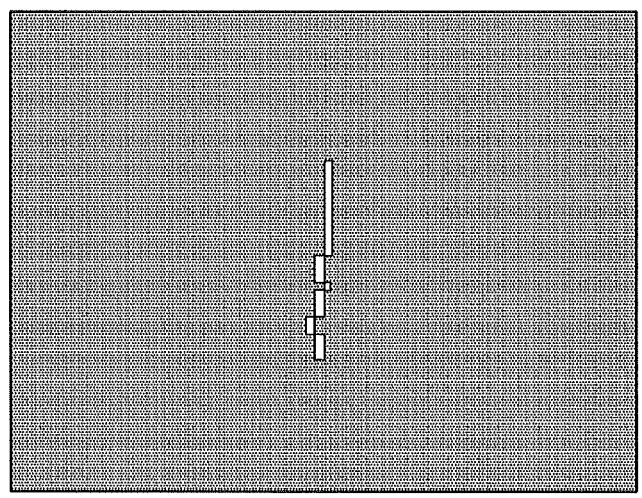
FIG. 3D schematically shows a plurality of skeletons obtained from horizontally scanning a plurality of black lines.
Figure 3E:
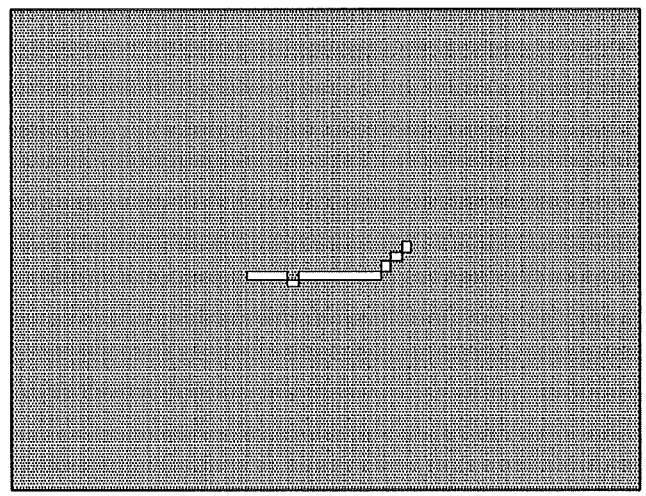
FIG. 3E schematically shows the skeletons obtained from vertically scanning the black lines.
Figure 3F:
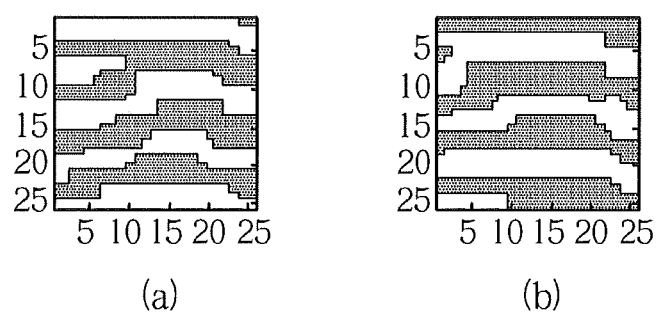
FIG. 3F schematically shows a representation of a plurality of detecting blocks, a and b are respectively corresponding to the middle pixel of each skeleton.

A skeleton extraction process step S40 is employed to scan the binary image downscaled 144 times in a first direction. Subsequently, the binary image downscaled 144 times is scanned in a second direction perpendicular to the first direction. Note that, the first direction can be arbitrarily selected, as long as the second direction is perpendicular to the first direction. By doing so, the skeleton extraction process can identify the location of the decipherable pattern in either direction, and orientation of the decipherable pattern is irrelevant. During each scan, a first location at which a black pixel appears after a white pixel and a second location at which a black pixel appears before a white pixel are in turn detected, and a black line is obtained by connecting the first location and the second location. After the binary image has completely been scanned, a plurality of black lines can be acquired, then the middle points of the black lines are extracted and the adjacent middle points are connected to obtain a plurality of skeletons, as shown in FIG. 3D and FIG. 3E.

Unlike previous illustrative embodiments, general fingerprint images do not contain background objects, thus it only needs to enlarge the coordinate values of the middle pixels of the skeletons by 12 times to identify the fingerprint location.

Those skilled in the art will readily observe that numerous modifications and alterations of the device and method may be made while retaining the teachings of the invention.

What is claimed is:

1. A method for fast locating a decipherable pattern in an input image, which downscales the input image to extract a plurality of skeletons, comprising the steps of:
   (A) applying a pre-process to the input image to acquire a binary image downscaled n times, wherein n is a real number;
   (B) identifying a plurality of black lines so as to extract at least one skeleton;
   (C) enlarging each of the coordinate values of at least one pixel of the at least one skeleton by $n^{1/2}$ times, and on the input image plane, using the enlarged coordinate values as the central points for establishing a plurality of detecting blocks, wherein each detecting block contains a plurality of pixel feature values corresponding to the input image plane; and
   (D) employing a grading mechanism to determine the corresponding detecting blocks of the decipherable pattern.

2. The method according to claim 1, wherein the step (A) further comprises pre-process steps of:
   (A-1) downscaling the input image in order to decrease the number of pixels;
   (A-2) filtering the input image by using a low-pass filter;
   (A-3) compensating the illumination of the input image;
   (A-4) binarizing the pixel feature values of the input image; and
   (A-5) filling the broken areas of the input image and eliminating the redundant black pixels of the input image.

3. The method according to claim 2, wherein the step (A-1) uses a bilinear interpolation to downscale the input image.

4. The method according to claim 2, wherein the low-pass filter used in the step (A-2) is a mean filter.

5. The method according to claim 2, wherein the step (A-3) uses a log transformation to compensate illumination of the input image.

6. The method according to claim 2, wherein the step (A-4) uses a constant threshold or an adaptive threshold to binarize the pixel feature values of the input image.

7. The method according to claim 2, wherein the step (A-5) uses a median filter to fill the broken areas of the input image and eliminating the redundant black pixels of the input image.

8. The method according to claim 1, wherein a scanning process is used in the step (B) to detect the black lines by scanning the binary image downscaled n times, pixel by pixel in two different directions, comprising the steps of:
   (B-1) detecting a first location at which a black pixel appears after a white pixel;
   (B-2) detecting a second location at which a black pixel appears before a white pixel;
   (B-3) connecting the first location and the second location; and
   (B-4) repeating the step (B-1) to the step (B-3) until all pixels of the binary image have been scanned to acquire the black lines.

9. The method according to claim 8, wherein the directions for the scanning process are perpendicular to one another.

10. The method according to claim 9, wherein the scanning process is done in an interlaced scan manner.

11. The method according to claim 9, wherein the skeletons are extracted by finding the middle points of the black lines scanned in the first direction and then connecting the adjacent middle points; and finding the middle points of the black lines scanned in the second direction and then connecting the adjacent middle points.

12. The method according to claim 1, wherein the detecting blocks are rectangular and have an identical size.

13. The method according to claim 12, wherein the ratio between width M of the input image and width W of the detecting blocks is M/W, wherein $12 \leq M/W \leq 64$; and the ratio between height N of the input image and height H of the detecting blocks is N/H, where N/H=M/W.

14. The method according to claim 1, wherein the input image is a grayscale image, and the pixel feature values are the grayscale values of the grayscale image respectively.

15. The method according to claim 1, wherein the input image is a color image transformed into a grayscale image, and the pixel feature values are the grayscale values of the grayscale image respectively.

16. The method according to claim 1, wherein the decipherable pattern contains a plurality of lines at intervals.

17. The method according to claim 16, wherein the decipherable pattern is 1-D barcode.

18. The method according to claim 16, wherein the decipherable pattern is 2-D barcode.

19. A computer-readable storage medium stores computer executable program implementing a method according to claim 1.

* * * * *